United States Patent [19]

Born et al.

[11] 4,403,325
[45] Sep. 6, 1983

[54] GASDYNAMIC CO2 LASER AND METHOD FOR OPERATING SUCH A LASER

[75] Inventors: Gunthard Born; Konrad Altmann, both of Munich, Fed. Rep. of Germany

[73] Assignee: Messerschmitt-Boelkow-Blohm Gesellschaft mit beschraenkter Haftung, Munich, Fed. Rep. of Germany

[21] Appl. No.: 240,620

[22] Filed: Mar. 5, 1981

[30] Foreign Application Priority Data

Mar. 28, 1980 [DE] Fed. Rep. of Germany ....... 3012091

[51] Int. Cl.³ .............................................. H01S 3/09
[52] U.S. Cl. ................................................... 372/90
[58] Field of Search ......................... 372/59, 60, 89, 90

[56] References Cited

U.S. PATENT DOCUMENTS 3,621,461  11/1971  Cason et al. ........................... 372/90

FOREIGN PATENT DOCUMENTS 2303396  10/1976  France ................................... 372/90

OTHER PUBLICATIONS

"$CO_2+N_2+CO+H_2O$ Gas-Dynamic Laser", Shmelev et al., Soviet Journal Quant. Electron, vol. 4, No. 8, Feb. 1975, pp. 944–946.

Primary Examiner—William L. Sikes
Assistant Examiner—Léon Scott, Jr.
Attorney, Agent, or Firm—W. G. Fasse; D. H. Kane, Jr.

[57] ABSTRACT

In a gasdynamic $CO_2$ laser mixing of hot and cold gasses takes place simultaneously with causing an inversion. The cold gas is air supplied through a compressor at a pressure in the range of 1 to 10 bar into the combustion chamber. Preferably the compressor output is supplied to two points of the combustion chamber, namely a zone directly upstream of and adjacent to the Laval nozzle and a zone in the combustion chamber further removed from the Laval nozzle.

6 Claims, 1 Drawing Figure

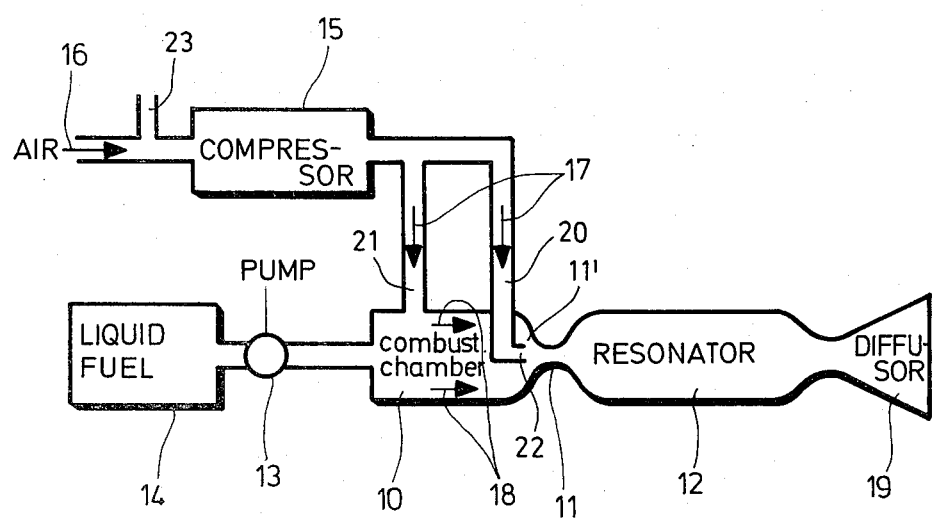

GASDYNAMIC CO2 LASER AND METHOD FOR OPERATING SUCH A LASER

BACKGROUND OF THE INVENTION

The present invention relates to a gasdynamic $CO_2$ laser and to a method for operating such a laser. In such a laser an inversion may take place simultaneously with the mixing of a cold gas with the hot combusting gas.

German Patent Publication (DE-OS) No. 2,022,876 discloses gasdynamic $CO_2$-lasers in which the hot gas production is accomplished by the combustion of a fuel such as gasoline or benzene and so forth with the addition of oxygen. This type of laser, however, has the disadvantage that the pressure in the combustion chamber is very high. Such pressure may be within the range of about 30 to 100 bar. As a result, it is necessary to provide powerful compressors capable of providing a high volume oxygen supply. Such compressors must have a high compression ratio which in turn makes such compressors bulky.

It has been suggested to increase the power of such gasdynamic laser systems by mixing a cold gas with the hot gas simultaneously with the occurrence of the normal inversion, produced by the adiabatic expansion in the laval nozzles.

OBJECTS OF THE INVENTION

It is the aim of the invention to achieve the following objects singly or in combination:

to further improve a laser system operating under the hot and cold gas mixing priciple so that it will function by using the fuel gases still more efficiently; and to mix the cold gas with the hot gas at relatively low pressures as compared to the prior art.

SUMMARY OF THE INVENTION

The gasdynamic $CO_2$ laser according to the invention comprises, in addition to its conventional components, a low pressure cold air compressor which is operatively connected to the combustion chamber by two channels for mixing cold air at a pressure within the range of 1 to 10 bar with the hot fuel gas in the combustion chamber and in the nozzle zone just upstream of the nozzle which causes an amplifier production of an inversion of the hot lasing gas.

BRIEF FIGURE DESCRIPTION

In order that the invention may be clearly understood, it will now be described, by way of example, with reference to the accompanying drawing, wherein the single FIGURE shows a schematic diagram of a gasdynamic laser system according to the invention.

DETAILED DESCRIPTION OF PREFERRED EXAMPLE EMBODIMENTS AND OF THE BEST MODE OF THE INVENTION

The present laser system comprises a combustion chamber 10 operatively connected to a resonator 12 by means of a Laval nozzle 11. The output of the resonator is conventionally connected to a diffuser 19. Fuel supply means including a fuel tank 14 and a fuel conveying pump 13 are operatively connected to the combustion chamber 10. The fuel tank 14 holds liquid fuel, such as gasoline or benzene and so forth. Atmospheric air 16 is compressed in the compressor 15 to a pressure range within 1 to 10 bar. The output of the compressor 15 supplies the compressed air 17 into the combustion chamber 10 through a duct means 20 and 21. The duct 20 has a bent open end 22 feeding the compressed cold air into a nozzle zone 11' immediately adjacent to and upstream of the nozzle 11. The open end 22 of the duct 20 directly faces the nozzle 11 in axial alignment with the nozzle axis. By means of this arrangement it is accomplished that the mixing of the hot gas and the cold air takes place simultaneously with the production of an inversion during the expansion in the laval nozzle 11, whereby an enhanced inversion is achieved. The branch duct 21 supplies its air portion into the combustion chamber 10 at a point upstream of the zone 11' as viewed in the flow direction from left to right in the illustration. The air supplied through the duct branch 21 functions as an oxidating means for combusting the fuel supplied through the pump 13 and for maintaining the combustion in the chamber 10.

The cold air 16 is taken directly from the atmosphere and its pressure is increased by the compressor 15 to the relatively low range of 1 to 10 bar as compared to the compression required according to the prior art in the range of 30 to 100 bar. Further, the cold air is preferably moistened by introducing water droplets through a supply pipe 23 into the air flow. The water droplets may be introduced upstream or downstream of the compressor 15.

It is an advantage of the invention that the ratio of the flow cross-sectional area F of the flow channel upstream of the Laval nozzle or nozzles 11 to the flow cross-sectional area $F^*$ of the nozzle neck may be relatively small so that $F/F^*$ is about 3 to 1. Such relatively small ratio has become possible because the present mixing method provides a cooling of the hot gas 18 in the nozzle neck zone 11' to which the compressed cold gas 17 is supplied through the branch conduit 20 and the outlet 22. This in turn has the advantage that the cold gas requires only a small compression as disclosed above. Another advantage is seen in the fact that the cold gas directly cools the Laval nozzle or nozzles 11.

Although the invention has been described with reference to specific example embodiments, it will be appreciated, that it is intended, to cover all modifications and equivalents within the scope of the appended claims.

What is claimed is:

1. A gasdynamic $CO_2$ laser, comprising combustion chamber means for combusting a fuel gas, resonator means including resonant cavity means for a laser action, nozzle means operatively interconnecting said combustion chamber means to said resonator means for expanding a hot gas into said resonator means, fuel supply means operatively connected to said combustion chamber means for supplying a fuel into said combustion chamber means, air compressor means for compressing air, duct means operatively connecting said air compressor means to said combustion chamber means for supplying compressed cold air at a pressure within the range of 1 to 10 bar into said combustion chamber means for mixing with a hot fuel gas in said combustion chamber means, and wherein said duct means for supplying cold air into said combustion chamber means comprise a first branch (21) connecting the air compressor means to the combustion chamber means and a second branch (20) supplying compressed cold air into a combustion chamber zone directly adjacent to and upstream of said nozzle means to cause said mixing simultaneously with the production of an inversion of said hot gas.

2. The laser of claim 1, wherein said second branch comprises an outlet end having an opening directed to face said nozzle means.

3. The laser of claim 1, wherein said nozzle means have a flow cross-sectional area ratio of about 3 to 1.

4. The laser of claim 1, further comprising means for introducing water droplets into the cold air.

5. A method for operating a $CO_2$ laser, comprising producing an inversion in said laser and simultaneously mixing a cold gas with a hot combusting gas in a combustion chamber of said laser, said cold gas being cold air compressed to have an excess pressure within the range of 1 to 10 bar, and wherein said compressed cold air is introduced at two points into the combustion chamber of the laser, one point of which is a zone directly adjacent to and upstream of a laser nozzle.

6. The method of claim 6, further comprising introducing water droplets into said cold air for distribution of said water droplets in the cold air.

* * * * *

UNITED STATES PATENT AND TRADEMARK OFFICE
CERTIFICATE OF CORRECTION

PATENT NO. : 4,403,325

DATED : September 6, 1983

INVENTOR(S) : Gunthard Born, Konrad Altmann

It is certified that error appears in the above-identified patent and that said Letters Patent is hereby corrected as shown below:

Claim 6, line 1, (Col. 4, line 8), replace "claim 6," by --claim 5--.

Signed and Sealed this

First Day of November 1983

[SEAL]

Attest:

GERALD J. MOSSINGHOFF

Attesting Officer

Commissioner of Patents and Trademarks